(12) United States Patent
Goodrich

(10) Patent No.: US 6,540,926 B2
(45) Date of Patent: Apr. 1, 2003

(54) FILTER ASSEMBLY

(76) Inventor: David Paul Goodrich, 14 Ox Hill Rd., Newton, CT (US) 06470

( * ) Notice: Subject to any disclaimer, the term of this patent is extended or adjusted under 35 U.S.C. 154(b) by 0 days.

(21) Appl. No.: 09/812,278

(22) Filed: Mar. 20, 2001

(65) Prior Publication Data

US 2001/0042725 A1 Nov. 22, 2001

Related U.S. Application Data

(62) Division of application No. 09/342,762, filed on Jun. 29, 1999, now Pat. No. 6,203,698, which is a continuation of application No. 08/942,997, filed on Oct. 2, 1997, now Pat. No. 5,916,442.

(51) Int. Cl.$^7$ .......................... B01D 37/00; B01D 36/04
(52) U.S. Cl. ................. 210/801; 210/799; 210/804; 210/806; 210/305; 210/311; 210/313
(58) Field of Search .............................. 210/799, 801, 210/804, 806, 311, 313, 305

(56) References Cited

U.S. PATENT DOCUMENTS

| | | | |
|---|---|---|---|
| 604,450 A | * | 5/1898 | White |
| 3,362,534 A | * | 1/1968 | Kay |
| 3,428,180 A | * | 2/1969 | Rogers |
| 4,017,397 A | * | 4/1977 | Copeland |
| 4,363,727 A | * | 12/1982 | Bonifacio |
| 4,789,098 A | * | 12/1988 | Shephers et al. |

FOREIGN PATENT DOCUMENTS

WO           9814263       *   4/1998

* cited by examiner

Primary Examiner—Thomas M. Lithgow
(74) Attorney, Agent, or Firm—Sheldon Parker; Parker & DeStefano

(57) ABSTRACT

The fuel filter assembly for filtering and removing water from a fuel under pressure includes an outerhousing, an inner sleeve member, an annular space between the outerhousing and the inner sleeve member, and filtering means for filtering the fuel. The filtering means is positioned within the sleeve member. The fuel inlet is at the upper end of the outer housing and provides fluid flow between the outer housing and the inner sleeve. The fuel inlet and annular space are positioned and dimensioned to provide a downward, non-circumferential, substantially laminar flow in the annular space. The inner sleeve member extends downwardly to a position below the bottom of the filtering means. The downwardly flowing fuel and contaminants must turn 180 degrees and flow upward through the filter media to the outlet. The slow moving denser components settle out in the accumulation chamber. The accumulation chamber is the region within the lower end of the outerhousing, below the filter media and the annular sleeve. The outlet valve provides a fluid drain for materials which accumulate in the accumulation chamber. The filtering means can be a hydrophobic filter media that prohibits the passage of water through the filter media.

3 Claims, 3 Drawing Sheets

FILTER ASSEMBLY

This application is a divisional of Ser. No. 09/342,762 filed on Jun. 29, 1999, now U.S. Pat. No. 6,203,698 which is a continuation of Ser. No. 08/942,997 filed on Oct. 2, 1997, now U.S. Pat. No. 5,916,442.

BACKGROUND OF THE INVENTION

1. Field of the Invention

The invention relates to a fuel filter, and more particularly, to a filter for use with diesel fuel, and in particular, to a water separating fuel filter.

2. Brief Description of the Prior Art

In U.S. Pat. No. 4,986,907, it is stated that the design of the filter is such that the interior fuel flow conduit is an elongated pipe whose perpendicular arrangement with respect to a longitudinal axis of the intake orifice allows a first impact of the fuel that enters the apparatus through the intake orifice. On flowing out from the interior pipe 30, the fuel hits against metal plate 50 (sectioned vertically in FIG. 3), which runs diametrically and also substantially longitudinally around the interior of the cylinder. While the diesel filter of the patent does a credible job of removing water, it is an expensive structure and does not remove trace portions of water. It also fails to completely separate water if the water is accumulated as a large slug. Also, entrapped air interferes with the water separation process.

According to the patent the fuel that leaves pipe 30 and hits against the plate is projected centrifugally to create a turbulence that initially facilitates separation of its components such as water, sulfur, sulfuric acid, etc. which, due to their greater specific weight in relation to the (diesel) fuel tend to be precipitated toward the bottom surface of cylinder 10.

The concept of using centrifugal force to facilitate fuel/water separation, is also found in U.S. Pat. No. 4,780,203, in which fuel flows obliquely downward to generate a rotational flow promoting separation of the denser water fraction from the fuel. An upturned lip is provided to collect water droplets that drift down the outer surface of the outlet conduit.

BRIEF DESCRIPTION OF THE DRAWINGS

The advantages of the instant disclosure will become more apparent when read with the specification and the drawings, wherein.

SUMMARY OF THE INVENTION

Figure 1:
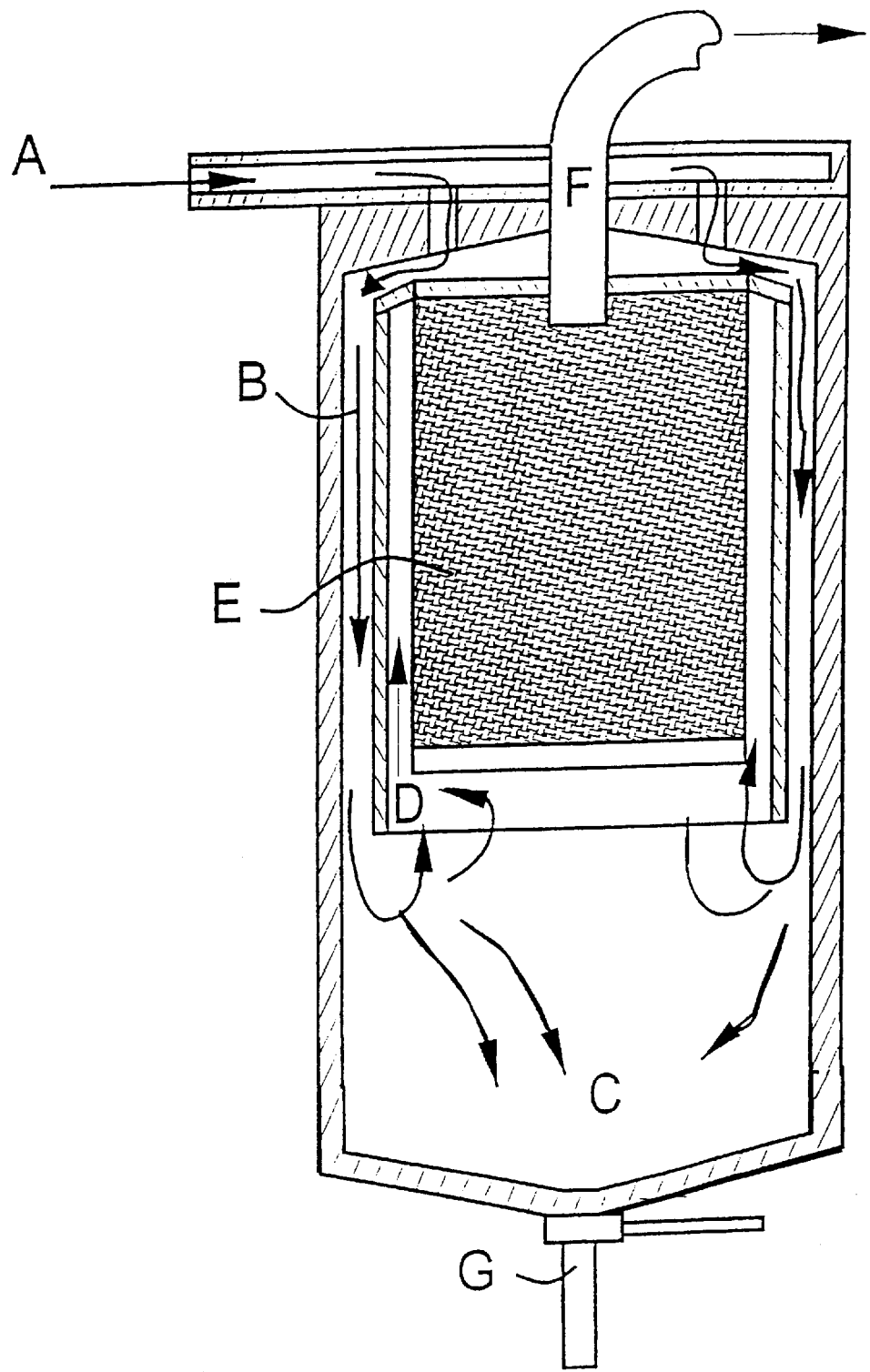
FIG. 1 is a cross-sectional view of a filter assembly in accordance with the present invention.

It has now been found that a fuel filter can be produced at a very low cost by scrupulously avoiding the turbulent flow found in prior art filters, such as U.S. Pat. Nos. 4,986,907 and 4,780,203. Additionally, it has been found that the instant design can provide equivalent performance or even superior performance with a smaller diameter unit. That is, the use of an equivalent diameter to that typically employed with the '907 design provides superior performance. In the design of the instant invention, water is completely removed regardless of the water slug size, until the contaminant chamber is filled.

The fuel filter assembly for filtering and removing water from a fuel under pressure includes an outerhousing, an inner sleeve member, an annular space between the outerhousing and the inner sleeve member, and filtering means for filtering the fuel. The filtering means is positioned within the sleeve member. The fuel inlet is at the upper end of the outer housing and provides fluid flow between the outer housing and the inner sleeve. The fuel inlet and annular space are positioned and dimensioned to provide a downward, non-circumferential, substantially laminar flow in the annular space. The inner sleeve member extends downwardly to a position below the bottom of the filtering means. The downwardly flowing fuel and contaminants must turn 180 degrees and flow upward through the filter media to the outlet. The slow moving denser components settle out in the accumulation chamber. The accumulation chamber is the region within the lower end of the outerhousing, below the filter media and the annular sleeve. The outlet valve provides a fluid drain for materials which accumulate in the accumulation chamber.

The filtering means can be a hydrophobic filter media that prohibits the passage of water through the filter media.

DETAILED DESCRIPTION OF THE INVENTION

The construction and use of the filter medium is well known in the art, as seen for example in U.S. Pat. No. 5,507,942. According to the '942 patent, in order to provide a constant level of least possible fuel flow restriction through the fuel filter assembly over the life of the filter media while utilizing the least possible amount of filter media, the filter media is housed vertically in the housing 12 so that the lower portions of the filter media become obstructed first before the fuel level rises and utilizes unobstructed upper portions of the filter media. A filter canister houses the filter media which is folded back and forth in a circular fashion so that a hollow cylinder is formed. The filter media, in the top view, the filter has a star, or sunburst appearance, resulting from the folding of the filter media. According to the '942, the filter media can also be continually rolled or wound about a vertical axis or reference cylinder to form a hollow cylinder having substantially concentric layers of filter media layered adjacent to one another.

The filter media can be fabricated from a paper based material, but any other suitable material, such as fiberglass, plastics, etc., may be utilized to provide the proper filtering characteristics while also being combustible for efficient disposal. In another embodiment, the filter media can be a hydrophobic filter media that prohibits the passage of water through the filter media. This can further facilitate precluding water from passing through the fuel filter assembly and effecting the performance of the engine or damaging fuel injection mechanisms of the engine. The fuel filter media disclosed in '942 and other patents, can readily be employed in the filter of the present invention.

The instant invention departs from the structure and functioning of prior art filters in that it provides laminar flow of fuel downward along a cylindrical sleeve. By laminar flow it is meant that there is a nonturbulent flow of a viscous fluid in layers near a boundary, as that of lubricating oil in bearings. Turbulent flow causes dirt particles and water to be entrained in the fuel stream and works against the separation process, where the dirt and water must pass through a turbulent stream of fuel during the separation step. It is believed that the centrifugal forces found in the prior art structures will separate dense materials from light materials, but unless, the separated streams are maintained as discreet streams, reentrainment occurs. In the present structure, the flow inlet at the top of the filter, does not produce a centrifugal action. Additionally, the annular space between the cylindrical sleeve and the inside wall of the housing, has a cross-sectional area which is sufficiently large to provide for laminar flow. Additionally, the speed of the fuel flow is dramatically reduced, thereby enhancing the separation process. The dense water and particular matter is directed downwardly along the sleeve. The rapid flow direction change results in the lighter materials, that is, the fuel, to be drawn upwardly more readily than the denser water. Reentrainment of the separated materials is not observed, when the system is in use. The use of a clear housing enables a user to view the flow patterns in the filter structure. It is observed that air bubbles do not adversely affect the separation process. Additionally, adding extremely large quantities of water to the fuel, for demonstration purposes, in the range between a half pint and a pint of water, for a one quart filter (12 inch circumference), did not adversely affect the operation of the system. The separation was immediate and complete. Whereas in a system such as seen in the U.S. Pat. No. 4,986,907, patent, water can be seen passing through the system, particularly when there is entrained air or very large quantities of water, the present system appears to be unaffected by air bubbles or the presence of a full accumulation chamber, provided that the water level is not above the turn around point. It is estimated that a 12 inch diameter filter of the present invention would be at least equivalent to a 16 inch diameter filter of the '907 design.

In U.S. Pat. No. 4,780,203 it is recognized that smaller droplets are more difficult to separate from the main stream, than large droplets. It is believed that this problem is due to the presence of the fluids in a swirling path which reentrains the smaller droplets. No such problem was encountered in the filter system of the instant invention. It also appears that with a laminar flow environment small droplets of water or air coalesce thus, facilitating the separation process.

The annular flow provides not only for a change in flow direction, but critically, provides for a flow rate change which is sufficient to allow fuel contaminants e.g. water and particulate to separate or fall out from the diesel fuel. By way of contrast, in U.S. Pat. No. 4,986,907, a centrifugal flow is produced which produces turbulent flow. The annular flow of the instant invention is vertically downward around the filter, and then vertically upward and through the filter. Turbulent flow entrains the water/particulate in the fuel and works against the separation. The annular flow is laminar flow. The cross-sectional area of the annular region is substantially less than that of the flow interior. The flow rate change in combination with the flow direction change, achieves the water/particulate-fuel separation. The rate of flow change is in the range from about 1/20 to about 1/50, and preferably is in the range from about 1/30 to about 1/40. The flow speed change is inversely proportional to the cross sectional area size. Flow rate, typically in gallons per minute, to remain constant will experience speed changes relative to the cross directional square area of the flow cavity size. When the cross-sectional area is cut in half, the flow speed must double to maintain a constant flow rate. The flow rate decrease from 1, the inlet flow, to 1/20, the downward annular flow, to 1/50, the upward annular flow, requires a corresponding cross-sectional area increase for each speed reduction. After the fuel reverses its downward, annular flow to the upward flow, the flow speed decreases due to the additional area increase. The flow speed in the vertical direction does not have the same level of criticality because the separation has already taken place.

The change in flow direction, by itself, can produce separation. The flow rate change also produces water/contaminant-fuel separation. The combination, optimizes the degree of separation which is achieved. In the optimum system, the separation can be essentially 100%. The foregoing system minimizes or eliminates turbulent flow. Turbulent flow causes water and other separated particles to be physically entrained in the fuel, thereby working against the separation.

The flow in the instant system is maintained parallel to the walls, so as to avoid turbulent flow. The centrifugal-turbulent flow of the U.S. Pat. No. 4,986,907, is avoided.

The flow is from about a half square inch feed pipe to a region between 5 inch ID outer wall and 4.5 inch OD inner wall. The annular flow is thus from a 0.5 sq. inch pipe to a 15 square inch annular area. The flow at the contaminant storage region increases to a 65 square inch area. Gravitational forces are used to enhance the separation. The flow rate after the turn upward, is determined by the annular space around the filter, between the filter and the annular tube, (the inner annulus), and is not narrowly critical. The inner annulus cross-sectional area should be at least equal to the cross sectional area of the inlet and outlet pipes. The separation take place prior to and during the flow direction change. Therefore, the flow characteristics of the second annulus need only be at least equal to the flow rate in the remainder of the system. The cross sectional area of the inner annulus thus is at least equal to the cross sectional area of the inlet and outlet pipes. A reduced cross-sectional area would produce an undesirable restriction in the system.

It is noted that in the U.S. Pat. No. 4,986,907, the particles must pass through centrifugal flowing turbulent fluid. By way of contrast, the downward flow in the instant invention is laminar. Thus the particles are going from a region of laminar, reduced flow speed, into a collection region, an area of further reduced speed. In U.S. Pat. No. 4,986,907, the flow is into a turbulent region, to a collection area and then upward.

The installation of the filter upside down would negate the operation of the filter, since the filter uses gravity to assist in the separation. In a reversed flow installation, the heavy particles, (water and dirt) would try to flow against the flow direction of the fuel and thus would tend to be reentrained. This would be comparable to the centrifugal turbulent flow in the '907 patent. Thus, the inlet at the top achieves a downward, gravity assisted flow and separation. The diesel fuel upward flow, leaves the water/particulate in the contaminant storage region. The terms top and bottom, referring to the inlet at the top and the ball valve drain at the bottom, are relative to the gravity flow. That is, gravity flow is from top to bottom.

The collected water and dirt or other solid particle contaminants can be discharged through the ball valve drain G.

The filter is a common paper filter, currently in use with diesel fuel engines. The ball valve drain, is a commercially available device and is not of a critical design.

In the '907, area entrainment interferes with the water-fuel separation. In the present device, the air is not a significant problem, due to the absence of turbulent flow. Additionally, the instant design provides for accumulated air to flow upward and outward. The mounting of the filter below the height of the gas tank, enables the accumulated air to vent to the gas tank.

Figure 2:
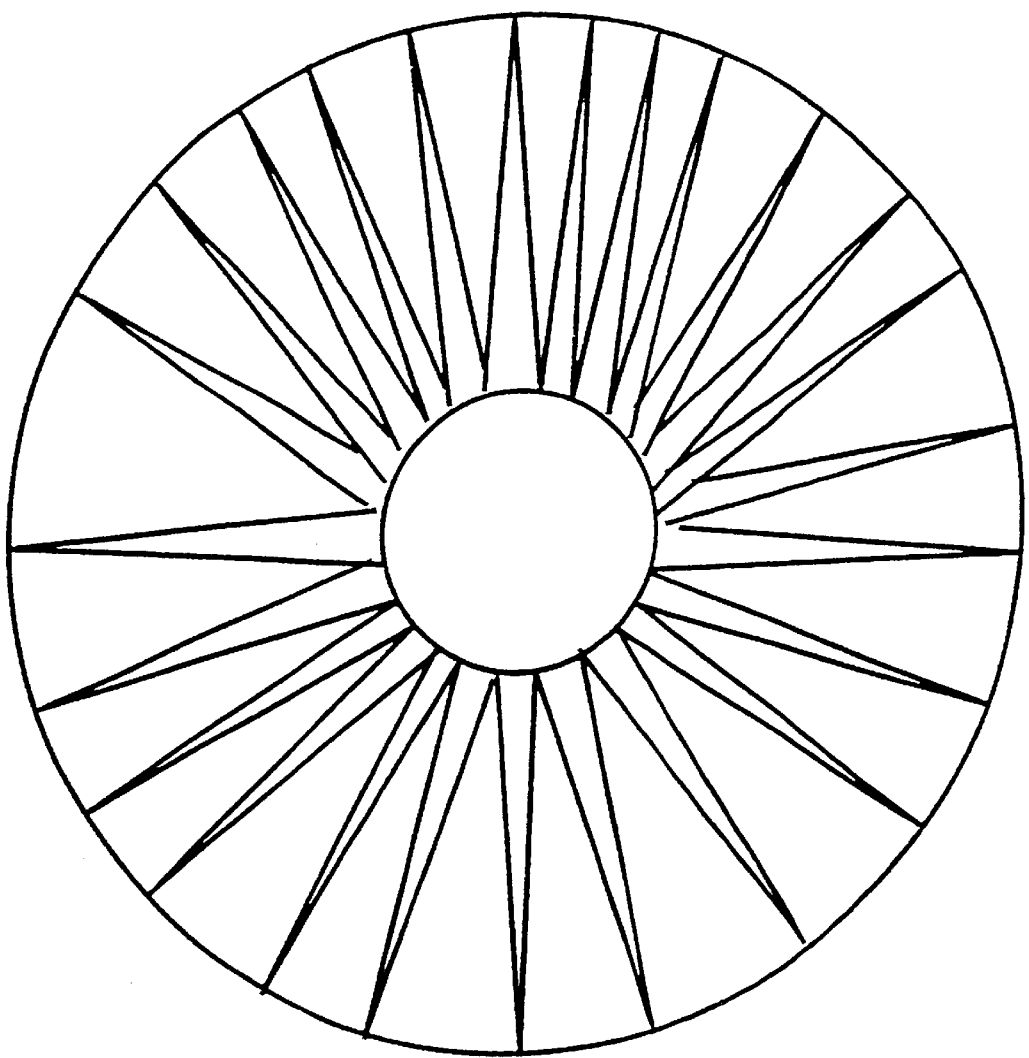
FIG. 2 is a schematic illustration of a filter media.
Figure 3:
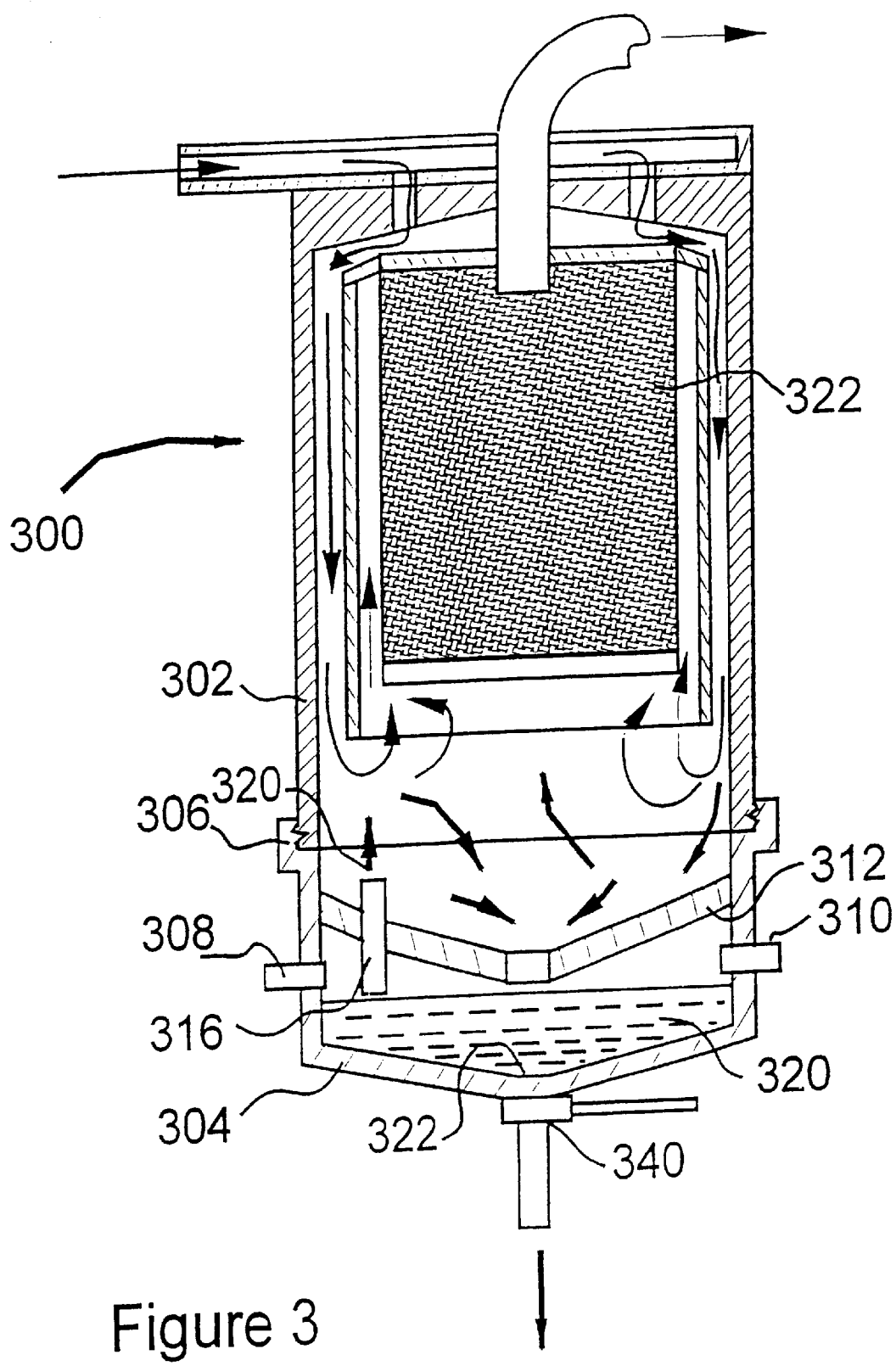
FIG. 3 is a cross-sectional view of an alternate filter assembly.

The embodiment of FIG. 3, illustrates a two part filter, indicated generally as 300. The upper unit 302, is essentially identical to the corresponding portions of the filter of FIG. 2.

The lower portion 304 of the filter 300, differs from the lower portion of the filter of FIG. 2, in that it contains a concave plate 312, which can be termed, a false bottom. Concave plate 312 serves as a separator wall between separated water and the fuel flowing or stored in the upper portion 302, of the filter 300. During the separation process, the diesel fuel, which is lighter than water, flows up and out of the filter, through the filter medium, 322. The water, which is lighter than the diesel oil, gravitates to the bottom of the filter, passes through the opening 314, in the concave plate 312, and is housed within the lower water storage region 322, is defined by the concave plate 312 and the lower section 304 of the filter unit 300. The lower storage region 322, is provided with one or more vents, which permit diesel fuel trapped in the water storage region 322, to vacate the storage region and for water to flow into the storage region. The vent 316 works in much the same way air vents work in commonly employed liquid storage containers. During the start-up period, the entire filter is filled with diesel fuel. When fuel flow starts, the water is separated from the fuel, migrates downwardly by gravity, as indicated by arrow 318, and enters the water storage region 322 through the opening 314. Diesel fuel in the water storage region 322, leaves the storage region by means of the vent 320, as indicated by arrow 320.

A primary benefit derived from separating the diesel fuel and the separated and stored water 320, is the prevention of reentrainment of the stored water 320.

The concave shape of the separator wall 312, is beneficial because the flow of water is directed, or naturally flows toward the opening in the concave wall 312.

The water storage region 322 can be provided with one or more water sensors 308 and 310. When the water level reaches the sensor, a signal is provided to indicate that water drainage is required obviously, the drainage can be automatic, and the water drainage valve 340, can be an electrically operated valve. The automatic opening of the drainage valve 340 causes the stored water to leave the filter 300. The discharged water can be stored in a separator water container, not shown. The electrically operate valve 340 can be time to remain open for a time period sufficient to drain water from the water storage region. Preferably, the timer is set to close the valve prior to the complete drainage of water, so that fuel is not drained from the system.

The water storage region is seen to operate when the filter is in a vertical position. However, if the filter is used in a vehicle which will be subjected to off-road use, the filter must be capable of operating at some offset angle. This condition can be encountered, even more readily, when the filter is used in boats.

In trucks, or other road operated vehicles, it would be unusual to subject the vehicle to a substantial side to side pitch. The vehicle could be required to climb or descend at a steep angle, however. In this instance, the use of a fore and aft water sensor would suffice. In a boat, side to side pitching can be expected and the sensors are preferably a pair of sensors positioned side to side, relative to the boat. In speed boats, it can be desirable to use four sensors, to accommodate the steep pitch of the boat during acceleration.

Since other modifications and changes varied to fit particular operating requirements and environments will be apparent to those skilled in the art, the invention is not considered limited to the example chosen for the purposes of disclosure, and covers all changes and modifications which do not constitute departures from the true spirit and scope of this invention.

What is claimed:

1. The method of separating a first liquid from a second liquid under pressure comprising the steps of:

passing a first liquid and a second liquid through a liquid inlet to a first downward flow region, said second liquid being lighter than said first liquid, subjecting said first liquid and said second liquid to a downward, non-circumferential, substantially laminar flow in a said first downward flow region, diverting said laminar fluid flow of said second fluid upwardly to a first upward flow region, said first upward flow regions being concentric with said first downward flow region, and diverting said laminar flow of said first fluid downward to a first fluid accumulation region, thereby separating said first liquid from said second liquid in the laminar flow region of the end of said first downward flow region, removing said first liquid from said first fluid accumulation region through a first liquid outlet, and flowing said second said second liquid though said first upward flow region and through a filter medium, said filter medium being coaxial and substantially coextensive with said first downward flow region and out of said first upward flow region through a second liquid outlet.

2. The method of claim 1, wherein said first liquid is water, and said liquid is a liquid fuel.

3. The method of claim 2, wherein said first liquid fuel is diesel fuel.

* * * * *